United States Patent
Jurbert et al.

(10) Patent No.: US 10,279,929 B2
(45) Date of Patent: May 7, 2019

(54) METHOD FOR INSTALLING AN ITEM OF EQUIPMENT IN A CABIN OF AN AIRCRAFT

(71) Applicant: AIRBUS SAS, Blagnac (FR)

(72) Inventors: Cédric Jurbert, La Salvetat Saint Gilles (FR); Nicolas Maury, Toulouse (FR); Julien Vullierme, Cornebarrieu (FR); François Demasles, Grenade (FR)

(73) Assignee: AIRBUS SAS (FR)

(*) Notice: Subject to any disclaimer, the term of this patent is extended or adjusted under 35 U.S.C. 154(b) by 640 days.

(21) Appl. No.: 14/940,694

(22) Filed: Nov. 13, 2015

(65) Prior Publication Data

US 2016/0167809 A1    Jun. 16, 2016

(30) Foreign Application Priority Data

Dec. 11, 2014  (FR) ...................................... 14 62233

(51) Int. Cl.
*B64F 5/50* (2017.01)
*B64F 5/10* (2017.01)
*B64C 1/06* (2006.01)

(52) U.S. Cl.
CPC . *B64F 5/50* (2017.01); *B64F 5/10* (2017.01)

(58) Field of Classification Search
CPC ..... B64F 5/10; B64F 5/50; B64C 1/06; B64C 1/061; Y10T 29/3039
USPC .................................................. 29/707, 709
See application file for complete search history.

(56) References Cited

U.S. PATENT DOCUMENTS

| | | | |
|---|---|---|---|
| 6,883,753 B1* | 4/2005 | Scown | B64C 1/06 244/118.1 |
| 7,270,297 B2* | 9/2007 | Schaefer | B66F 7/00 244/137.1 |
| 7,953,513 B2* | 5/2011 | Bhat | B29C 49/78 700/17 |
| 8,074,928 B2* | 12/2011 | Haack | B64C 1/18 244/118.5 |
| 8,406,920 B2* | 3/2013 | Asamizu | B23P 19/105 700/245 |
| 8,515,718 B2* | 8/2013 | Heuschmann | G05B 19/41885 345/427 |
| 8,700,191 B2* | 4/2014 | Marsh | B66F 3/08 187/203 |
| 9,248,902 B2* | 2/2016 | Benthien | B64C 1/26 |
| 9,644,765 B2* | 5/2017 | Breuer | F16L 3/26 |
| 2005/0184194 A1* | 8/2005 | Schaefer | B66F 7/00 244/118.1 |

(Continued)

OTHER PUBLICATIONS

French Search Report (dated Jul. 10, 2015) (FR 14 62233).

*Primary Examiner* — Bayan Salone
(74) *Attorney, Agent, or Firm* — Lerner, David, Littenberg, Krumholz & Mentlik, LLP

(57) ABSTRACT

A method for installing an item of equipment in a cabin, includes: determining the actual position of each anchoring location provided for the equipment in a first reference system and of each fixing location of the equipment in a second reference system, positioning the second reference system relative to the first reference system, prior to the installation of the equipment in the cabin, adjusting each adjustable connection in accordance with at least one characteristic determined from the actual position determined for each anchoring location and for each fixing location, positioning the adjusted adjustable connections which connect the equipment to the cabin.

6 Claims, 3 Drawing Sheets

(56) References Cited

U.S. PATENT DOCUMENTS

| | | | |
|---|---|---|---|
| 2006/0212161 A1* | 9/2006 | Bhat | B29C 49/78 700/197 |
| 2008/0065805 A1* | 3/2008 | Wu | G06F 1/186 710/301 |
| 2008/0205763 A1* | 8/2008 | Marsh | B64F 5/10 382/190 |
| 2009/0138126 A1 | 5/2009 | Marsh et al. | |
| 2011/0011978 A1 | 1/2011 | Haack et al. | |
| 2013/0327882 A1* | 12/2013 | Benthien | B64C 1/26 244/48 |
| 2014/0054417 A1 | 2/2014 | Spellman et al. | |

* cited by examiner

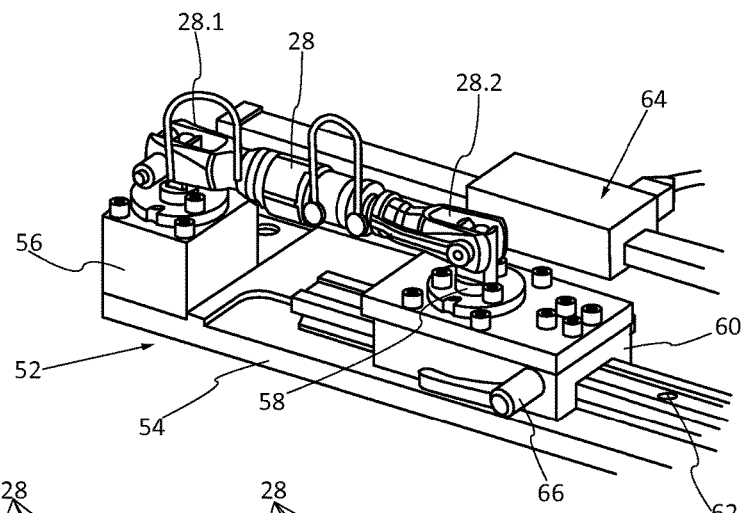
Fig. 4
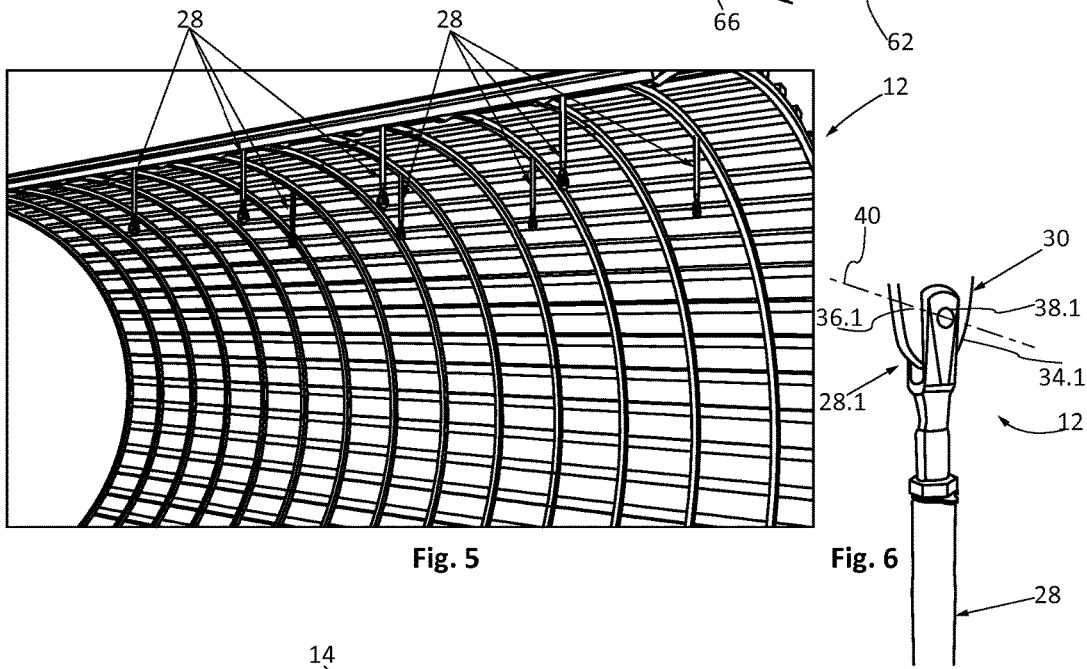
Fig. 5
Fig. 6
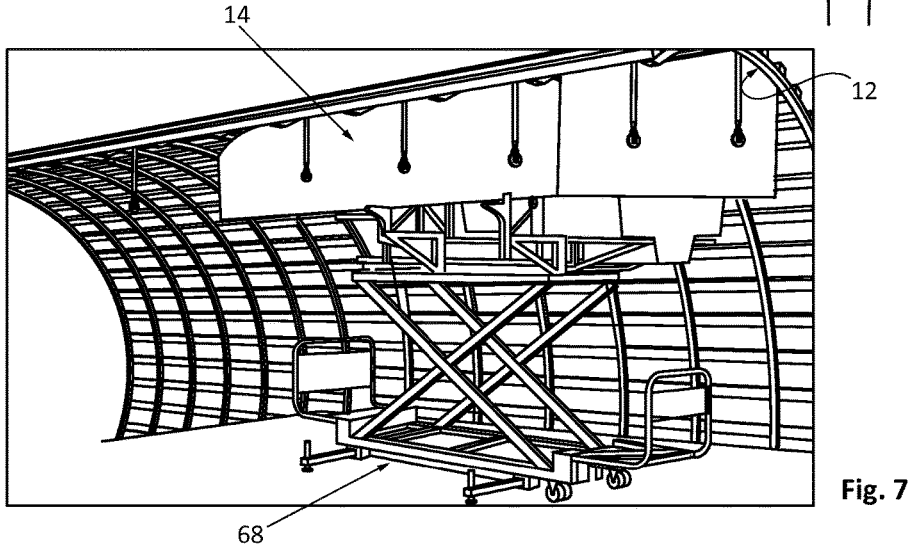
Fig. 7

METHOD FOR INSTALLING AN ITEM OF EQUIPMENT IN A CABIN OF AN AIRCRAFT

FIELD OF THE INVENTION

The invention relates to a method for installing an item of equipment in a cabin of an aircraft, such as, for example, a module which is suspended on the ceiling, in the central portion of a passenger cabin of an aircraft.

BACKGROUND OF THE INVENTION

When the interior of an aircraft is fitted out, several suspended modules are fixed to the ceiling in the central portion of the cabin. These suspended modules may be luggage modules or a suspended sleeping cabin which is intended for the crew.

According to an assembly method, each suspended module is connected to the structure of the cabin of the aircraft via a plurality of connection rods, each connection rod being connected at a first end to the suspended module and at a second end to the structure of the cabin of the aircraft.

Taking into account the production tolerances of the suspended modules and assembly tolerances of aircraft structures, it is generally necessary to readjust the position of the suspended modules after they have been fixed in order to position them correctly relative to the other items of equipment, such as, for example, the other fitting elements of the cabin.

The readjustment of the suspended modules and other items of equipment or fitting elements of the cabin of an aircraft is an operation which may be long and complex. This operation is even more complex to carry out for the suspended sleeping cabins since these modules are heavy and voluminous elements which are positioned at height.

In order to simplify the positioning of the suspended sleeping cabins, the document US2005/0184194 proposes a tool which comprises a first portion for transporting a suspended sleeping cabin in an aircraft cabin in alignment with the final position thereof and a second portion for raising it to the final position thereof and retaining it in this position until all the connection rods are in place. Even if this tool simplifies the operation for lifting the suspended sleeping cabins, it is not suitable for the readjustment operation.

BRIEF SUMMARY

Therefore, an aspect of the present invention may overcome the disadvantages of the prior art by providing a method for installing an item of equipment in a cabin of an aircraft which is intended to eliminate the readjustment operation.

The invention relates to a method for installing an item of equipment in a cabin, the equipment being connected to the cabin via a plurality of adjustable connections, each connection comprising a first end which is connected to an anchoring location which is fixedly joined to the structure of the cabin and a second end which is connected to a fixing location which is fixedly joined to the equipment. The method is characterized in that it comprises the steps of:
  determining the actual position of each anchoring location provided for the equipment in a first reference system,
  determining the actual position of each fixing location of the equipment in a second reference system,
  positioning the second reference system relative to the first reference system,
  determining at least one characteristic for each adjustable connection from the actual position determined for each anchoring location and each fixing location,
  prior to the installation of the equipment in the cabin, adjusting each adjustable connection in accordance with the characteristic determined,
  positioning the adjusted adjustable connections which connect the equipment to the cabin.

According to this solution, the connections are preadjusted before they are used to connect the equipment to the cabin. This preadjustment enables dimensional dispersions which arise from the assembly tolerances of the structure of the cabin and the production of the equipment to be taken into account. In this manner, the connections no longer need to be readjusted after they have been positioned, which contributes to reducing the installation time of the items of equipment in the cabin.

According to another feature, the second reference system is positioned relative to the first reference system in a virtual environment.

Advantageously, the method comprises a step of positioning a virtual representation of the equipment which is identical to the actual equipment in a virtual representation of the cabin which is identical to the actual cabin. This solution enables the simplification of the positioning of the equipment relative to the cabin in the virtual environment.

Preferably, a plurality of virtual representations of items of equipment are positioned relative to each other in the virtual environment.

According to an operating method, a laser is used to determine the actual position of the anchoring locations and/or the actual position of the fixing locations.

This method is more specifically intended for the installation of an item of equipment, such as a luggage module or a suspended sleeping cabin, which is connected to the cabin by means of connection rods which can be adjusted in terms of length, the length of each connection rod being determined from the actual position determined for each anchoring location and each fixing location.

Advantageously, for this application, the method uses:
  an adjustment tool in order to adjust the length of each connection rod and/or
  a lifting tool for positioning the equipment before connecting it to the connection rods which are adjusted in terms of length.

BRIEF DESCRIPTION OF THE DRAWINGS

Other features and advantages will be appreciated from the following description of the invention, which description is given purely by way of example with reference to the appended drawings, in which:

FIG. 4 is a perspective view of a tool which enables the connection rods which are used for fixing the suspended module to be adjusted in terms of length, FIG. 5 is a perspective view of the aircraft cabin illustrated in FIG. 1 in which there are positioned connection rods which are adjusted in terms of length and which are used to support the suspended module illustrated in FIG. 2, FIG. 6 is a perspective view which illustrates in detail the upper portion of a connection rod which is fixed to the structure of the cabin, FIG. 7 is a perspective view of the suspended module which is illustrated in FIG. 2 and which is positioned in the aircraft cabin illustrated in FIG. 1.

DETAILED DESCRIPTION

Figure 1:
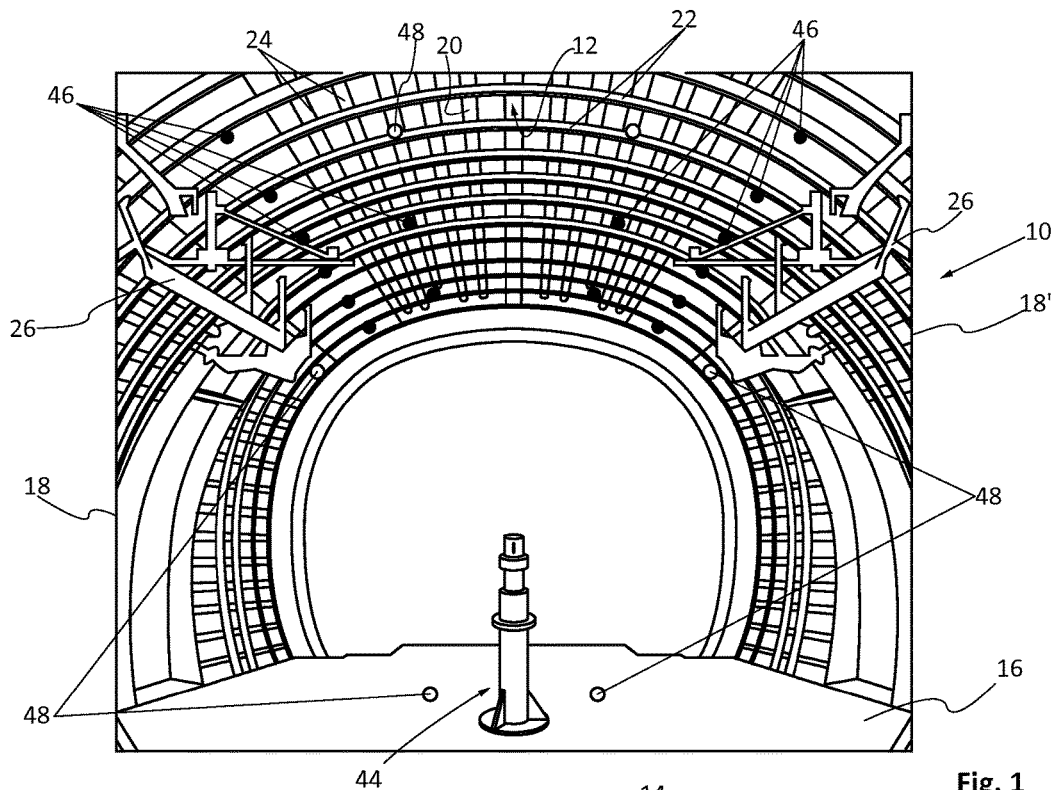
FIG. 1 is a front view of a structure of a cabin of an aircraft during a step of taking measurements of the structure which illustrates the invention.

FIGS. 1, 5 and 7 illustrate at 10 a cabin of an aircraft. According to one application, the cabin 10 corresponds to the passenger cabin.

Figure 2:
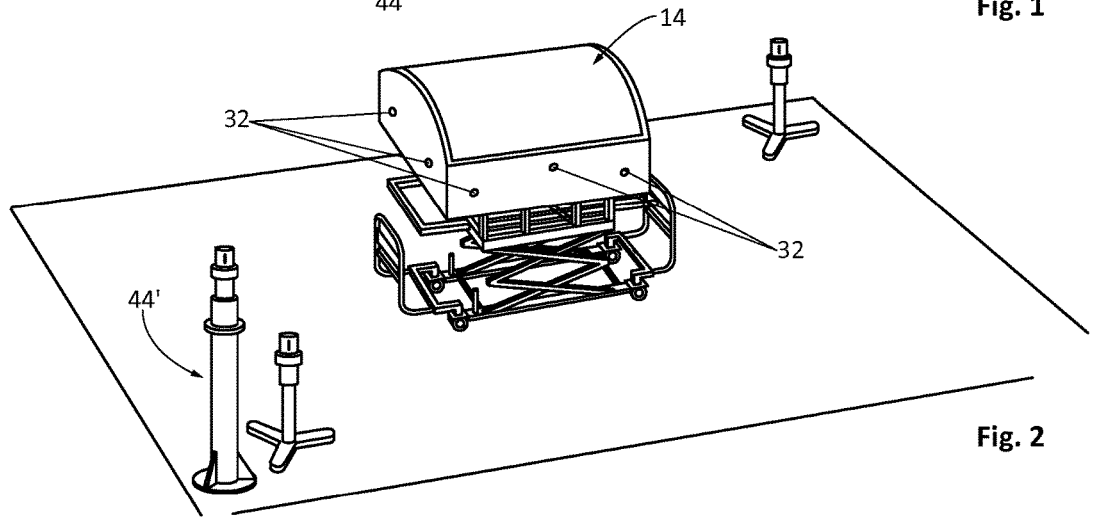
FIG. 2 is a perspective view of a suspended module during a step of taking measurements of the suspended module which illustrates the invention.

This cabin 10 comprises a structure 12 to which there is fixed at least one fitting element 14 which can be seen in FIGS. 2 and 7. Generally, several fitting elements 14 are placed in the cabin 10 and are connected to the structure 12. These different fitting elements 14 are positioned relative to each other so that there is only a small regular play between them.

According to an embodiment which can be seen in FIG. 1, the structure 12 of the cabin comprises a floor 16, lateral walls 18, 18' and a ceiling 20. The lateral walls 18, 18' and the ceiling 20 correspond to a portion of the fuselage of the aircraft.

For the remainder of the description, the longitudinal axis corresponds to the axis which extends from the front tip to the rear tip of the aircraft. It is designated X in FIG. 3. A transverse plane is a plane which is perpendicular to the longitudinal axis. A longitudinal direction is parallel with the longitudinal axis. A longitudinal plane is a plane which contains the longitudinal axis.

According to an embodiment, the lateral walls 18, 18' and the ceiling 20 comprise frames 22 which are arranged in transverse planes and ribs 24 which are arranged in longitudinal planes.

In addition to the frames 22 and the ribs 24, the structure 12 of the cabin may comprise other supports and/or reinforcements 26.

According to an application, the fitting element 14 is a suspended module such as a suspended sleeping cabin which is intended for the crew and which is configured to be fixed to the ceiling 20 of the cabin 10 and which comprises an outer surface, some portions of which can be seen from the inner side of the cabin. A suspended module may also be a luggage module.

When two fitting elements are juxtaposed, their outer surfaces are adjusted relative to each other and separated by a small regular play.

In the case of a suspended module 14, it is connected to the structure 12 by means of several connection rods 28 which are illustrated in FIG. 5. Each connection rod 28 comprises a first end 28.1 (visible in FIG. 6) which is connected to an anchoring location 30 of the structure 12 and a second end 28.2 (visible in FIG. 8) which is connected to a fixing location 32 which is fixedly joined to the suspended module 14.

According to an embodiment, the first end 28.1 of the connection rod 28 comprises a cover 34.1. In a complementary manner, the anchoring location 30 comprises a plate 36.1 which is fixedly joined to the structure 12 which cooperates with the cover 34.1. Finally, a spindle 38.1 connects the cover 34.1 and the plate 36.1 in order to obtain a pivot connection between the connection rod 28 and the structure 12. In order to accommodate the spindle 38.1, the cover 34.1 comprises two branches which each have a hole whose diameter is substantially equal to that of the spindle 38.1. In a parallel manner, the plate 36.1 comprises an axial hole 40 whose diameter is substantially equal to that of the spindle 38.1.

In a reference system which is associated with the cabin 10 of an aircraft, each anchoring location 30 should be positioned in accordance with a theoretical position.

Taking into account the assembly tolerances of the structure 12, the anchoring locations 30 are not in reality positioned precisely in accordance with their theoretical positions. In this manner, from one aircraft to another, the anchoring locations 30 are positioned differently. In this manner, the position of the axes 40 of the anchoring locations 30 may vary from one aircraft to another.

According to an embodiment, the second end 28.2 of the connection rod 28 comprises a cover 34.2. In a complementary manner, the fixing location 32 comprises a plate 36.2 which is fixedly joined to the suspended module 14 which cooperates with the cover 34.2. Finally, a spindle 38.2 connects the cover 34.2 and the plate 36.2 in order to obtain a pivot connection between the connection rod 28 and the suspended module 14. In order to accommodate the spindle 38.2, the cover 34.2 comprises two branches, each having a hole whose diameter is substantially equal to that of the spindle 38.2. In a parallel manner, the plate 36.2 comprises an axial hole 42 whose diameter is substantially equal to that of the spindle 38.2.

In a reference system which is associated with each suspended module 14, each fixing location 32 would have to be positioned in accordance with a theoretical position.

Taking into account the production tolerances of the suspended modules, the fixing locations 32 are not in reality positioned precisely in accordance with their theoretical positions. In this manner, for the same model, from one suspended model to the other, the fixing locations 32 are positioned differently. In this manner, the position of the axes 42 of the fixing locations 32 may vary from one suspended model to another for the same model of suspended modules.

Advantageously, at least one connection rod 28 can be adjusted in terms of length in order to be able to adjust the positioning of the suspended module 14 in the cabin 10.

The method for installing a suspended module 14 in a cabin 10 comprises the steps of:

determining the actual position of each anchoring location 30 provided for the suspended module 14 in a reference system associated with the cabin 10, determining the actual position of each fixing location 32 of the suspended module 14 in a reference system associated with the suspended module 14, positioning the reference system associated with the suspended module relative to the reference system which is associated with the cabin, determining the length of each connection rod 28 knowing the relative positions of the anchoring locations 30 and the fixing locations 32, prior to the installation of the suspended module 14 in the cabin 10, adjusting each connection rod 28 in accordance with the determined length, installing the suspended module 14 by connecting it to the cabin 10 using the connection rods 28 which are adjusted in terms of length.

According to an operating method illustrated in FIG. 1, a laser 44 is used to determine the actual position of each anchoring location 30. This laser 44 is positioned in the cabin 10 and a retroreflector is positioned at each location whose actual position in the cabin 10 has to be determined.

In this manner, a retroreflector 46 is positioned at each anchoring location 30.

Advantageously, retroreflectors 48 are positioned at different locations of the cabin 10 in order to determine a cabin reference system and each anchoring location 30 is positioned in this cabin reference system.

According to an operating method illustrated in FIG. 2, a laser 44' is used to determine the actual position of each fixing location 32. This laser 44' is positioned close to the actual suspended module 14 and a retroreflector is positioned at each location whose actual position on the suspended module 14 has to be determined. In this manner, a retroreflector is positioned at each fixing location 32.

Advantageously, the actual position of other locations of the suspended module 14 is measured in order to determine a reference system associated with the suspended module and each fixing location 32 is positioned in this reference system which is associated with the suspended module.

The laser 44' may be the same as that used for the step for determining the actual position of each anchoring location 30.

The invention is not limited to the use of a laser in order to carry out the measurements which enable the actual positions of the anchoring locations and the fixing locations to be determined in their respective reference systems. By way of example, a camera or any other measuring device could be used.

Based on the measurements of the actual position of the anchoring locations 30 in the cabin 10 and the fixing locations 32 on the suspended module, it is possible to calculate the relative positions of the anchoring locations 30 and the fixing locations 32 in the desired position of the suspended module relative to the cabin. This desired position of the suspended module relative to the cabin, which corresponds to the desired relative positions of the reference system associated with the suspended module and the cabin reference system, is determined by the planes of the aircraft.

The calculation of the relative positions of the anchoring locations 30 and the fixing locations 32 may be carried out by means of an item of software operating on a computer. Furthermore, if the desired position of the suspended model relative to the cabin has a tolerance margin, this item of software may enable the selection of a preferred position in this tolerance margin, for example, a position which is easier to obtain in view of the actual positions of the anchoring locations 30 and the fixing locations 32, or a position which enables a better positioning relative to the other items of equipment of the cabin.

Figure 3:
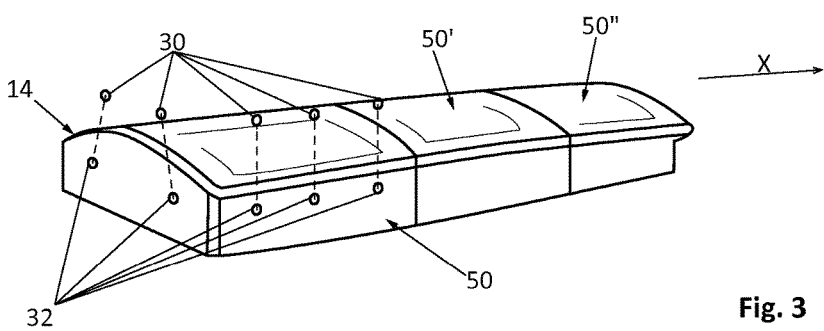
FIG. 3 is a virtual representation of the suspended module illustrated in FIG. 2 which is positioned correctly in a virtual representation of the aircraft cabin illustrated in FIG. 1.

In a specific embodiment, as illustrated in FIG. 3, this item of software enables the display in a virtual environment of the reference system associated with the suspended model positioned relative to the reference system associated with the cabin. Preferably, a virtual representation 50 of the suspended module which is identical to the actual suspended module is positioned in a virtual representation of the cabin which is identical to the actual cabin. To this end, the measurements taken using the laser or lasers 44, 44' during the two preceding steps are used.

Advantageously, the virtual representations 50, 50', 50" of a plurality of suspended modules or other fitting elements are positioned in the virtual cabin. In this manner, it is possible to position them virtually one relative to the other.

In this virtual environment, the different anchoring locations 30 and fixing locations 32 are positioned.

In accordance with the relative positions of the anchoring locations 30 and the fixing locations 32, for a selected position of the suspended model relative to the cabin, the software can calculate characteristics of the connections which have to connect each fixing location 32 to an anchoring location 30. These characteristics may comprise, for example, the length and the angular position of these connections. In the case of a module which is suspended in the structure via a plurality of connection rods 28, the length of each connection rod 28 is determined by calculating the distance separating the anchoring location and the fixing location which are connected by the connection rod 28.

Subsequently, each connection rod 28 is adjusted in accordance with the desired length.

To this end, it is possible to use an adjustment tool 52 in order to adjust the length of each connection rod 28. According to an embodiment, the adjustment tool 52 comprises a support 54, a first head 56 which is fixed relative to the support 54 and a second head 58 which can be moved relative to the support 54. The first head 56 comprises a means for fixedly joining in a removable manner the first end 28.1 of a connection rod to be adjusted and the second head 58 comprises a means for fixedly joining in a removable manner the second end 28.2 of the connection rod to be adjusted. The movable head 58 is fixed to a carriage 60 which slides along a rail 62 which is fixedly joined to the support 54. A measurement rule 64 enables the position of the second head 58 to be controlled. A blocking system 66 enables the carriage 60 to be fixed in position relative to the rail 62. In order to adjust a connection rod 28, it is mounted on the adjustment tool 52 by connecting the ends 28.1 and 28.2 of the connection rod to the heads 56 and 58. Subsequently, the length of the connection rod 28 is adjusted by moving the carriage 60 along the rail 62. The measurement rule 64 enables the position to be determined in which the carriage 60 is fixed as a result of the blocking system 66 in order to obtain the desired length for the connection rod 28.

Of course, the invention is not limited to this adjustment tool in order to adjust the length of the connection rods.

When the connection rods are adjusted in terms of length, each of them is connected to the structure 12, as illustrated in FIGS. 5 and 6, by positioning the spindle 38.1. In this configuration, the connection rods 28 are suspended on the structure 12 and each of them is free to pivot about the spindle 38.1 which connects it to the structure 12.

It should be noted that, since each connection rod is adjusted in terms of length in order to correspond to the desired instance between a fixing location 32 and an anchoring location 30, a specific connection rod 28 has to be necessarily installed at the anchoring location 30 for which it is intended.

Figure 8:
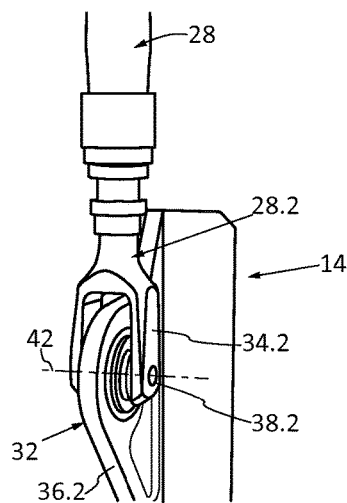
FIG. 8 is a perspective view which illustrates in detail the lower portion of a connection rod which is fixed to the suspended module.

When the connection rods are installed, the suspended module 14 is positioned relative to the structure 12 using a lifting tool 68, as illustrated in FIG. 7. After the suspended module 14 has been positioned, it is connected to the connection rods by positioning for each of them a spindle 38.2 as illustrated in FIG. 8.

Figure 9:
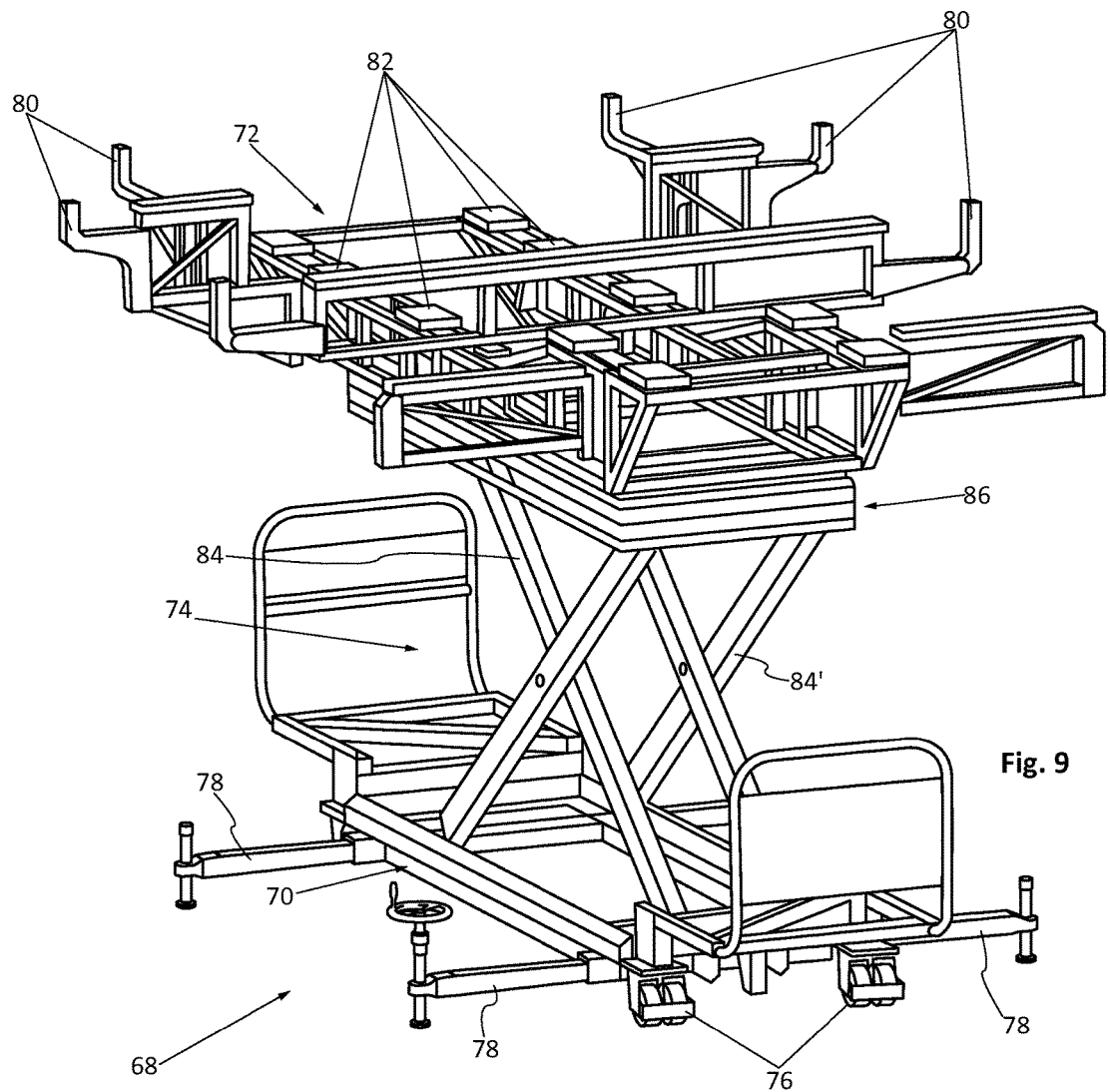
FIG. 9 is a perspective view of a lifting tool which illustrates an embodiment of the invention.

A lifting tool 68 is illustrated in detail in FIG. 9.

This lifting tool 68 comprises a movable carriage 70, a cradle 72 which is configured to support a suspended module which is intended to be installed and a connection 74 which connects the cradle 72 to the movable carriage 70 and which is configured to move the cradle 72 at least vertically relative to the movable carriage 70.

According to an embodiment, the movable carriage 70 comprises wheels 76 which are provided with a braking system in order to fix the movable carriage 70 when the suspended module is positioned in alignment with the final position thereof. This movable carriage 70 preferably comprises stabilizers 78 in order to limit the risks of tilting of the suspended module when it is an upper position and not yet fixed to the connection rods 28.

The cradle 72 comprises lateral stops 80 for fixing the suspended module in a horizontal plane. Advantageously, these lateral stops can be adjusted in order to adapt the dimensions of the cradle to those of different models of suspended modules.

Preferably, the cradle 72 comprises runners 82 on which the suspended module which is intended to be installed rests. These runners 82 are of a material which limits the risks of damage to the suspended module.

The connection 74 between the movable carriage 70 and the cradle 72 comprises two scissor type assemblies 84 and 84' which are each composed of two connection rods which pivot relative to each other so as to form an X, each connection rod comprising a first end which is connected to the movable carriage 70 and a second end which is connected to the cradle 72. The connection 74 comprises a lifting mechanism which enables the first ends and/or the second ends of the connection rods of the scissor type assemblies 84, 84' to be moved apart or moved together in order to bring about the lowering or the lifting of the cradle 72 relative to the movable carriage 70. This lifting mechanism may be manual or motorized.

Advantageously, the connection 74 comprises a movable table 86 which is interposed between the scissor type assemblies 84, 84' and the cradle 72, this movable table 86 being configured to enable the cradle 72 to move in a horizontal plane. According to an embodiment, the movable table 86 comprises a lower framework which is connected to the scissor type assemblies 84, 84', an intermediate framework which can be moved relative to the lower framework in a first direction, an upper framework which is connected to the cradle 72 and which can be moved relative to the intermediate framework in a second direction perpendicular to the first.

The lifting tool 68 is not described in greater detail since other solutions could be envisaged for lifting the suspended module.

Although the invention is described for the installation of a suspended module, it is by no means limited to this application and can be used for the installation in a cabin of other items of equipment which are connected to at least one structure of the cabin by adjustable connections which enable the positioning of the equipment in the cabin 10 to be adjusted.

The method for installing an item of equipment in a cabin 10 comprises the steps of:
  determining the actual position of each anchoring location 30 provided for the equipment in a first reference system associated with the cabin 10,
  determining the actual position of each fixing location 32 of the equipment in a second reference system associated with the equipment,
  positioning the second reference system relative to the first reference system,
  determining at least one characteristic for each adjustable connection 28 from the actual position determined for each anchoring location and each fixing location in their respective reference systems,
  prior to the installation of the equipment in the cabin, adjusting each adjustable connection 28 in accordance with the characteristic determined in the virtual environment,
  positioning the adjusted adjustable connections 28 which connect the equipment 14 to the cabin 10.

Furthermore, a specific adjustment tool may be configured to simplify the adjustment of each connection.

Finally, a positioning tool may be configured to position the equipment relative to the structure of the cabin prior to it being fixed, in the manner of the lifting tool 68 for lifting the suspended modules.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for installing an actual equipment in an actual cabin, the actual equipment being connected to the actual cabin via a plurality of connection rods configured to be adjusted in terms of length, each connection rod comprising a first end connected to an anchoring location fixedly joined to the structure of the actual cabin and a second end connected to a fixing location fixedly joined to the actual equipment, the method comprises-:
  determining, using a first optical device and a first plurality of optical reflectors, an actual position of each anchoring location provided for the actual equipment in a first reference system, each of the first plurality of optical reflectors being positioned at a corresponding anchoring location;
  determining, using a second optical device or the first optical device and a second plurality of optical reflectors, an actual position of each fixing location of the actual equipment in a second reference system, each of the second plurality of optical reflectors being positioned at a corresponding fixing location;
  positioning, using a computer, the second reference system relative to the first reference system in a virtual environment;
  determining, by the computer, a length of each connection rod from the actual position determined for each anchoring location and each fixing location;
  prior to the installation of the actual equipment in the actual cabin, adjusting, by an adjustment tool, each of the plurality of connection rods in accordance with the determined length; and
  positioning the adjusted connection rods connecting the actual equipment to the actual cabin.

2. The method according to claim 1, further comprising positioning, using the computer, a virtual representation of an equipment identical to the actual equipment in a virtual representation of a cabin identical to the actual cabin.

3. The method according to claim 1, wherein a plurality of virtual representations of items of equipment are positioned relative to each other in a virtual environment.

4. The method according to claim 1, wherein using the optical device comprising using a laser to determine at least one of the actual position of the anchoring locations and the actual position of the fixing locations.

5. The method according to claim 1, wherein using the adjustment tool comprises adjusting the length of each connection rod.

6. The method according to claim 1, further comprising using a lifting tool for positioning the equipment before connecting the equipment to the connection rods adjusted in terms of length.

\* \* \* \* \*